June 26, 1945.    E. OTZMANN    2,378,945
TANK
Filed Jan. 1, 1943

Inventor
Edward Otzmann

By C. E. Harrstrom & H. E. Thibodeau
Attorneys

Patented June 26, 1945

2,378,945

UNITED STATES PATENT OFFICE 2,378,945

TANK

Edward Otzmann, Roselle Park, N. J.

Application January 1, 1943, Serial No. 471,054

6 Claims. (Cl. 180—9.1)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to combat tanks.

An object of the invention is to provide a tank which is able to pass across trenches and pits employed as tank traps or to extricate itself from these.

Another object of the invention is to provide a tank which can lift itself over obstacles placed above or projecting above the ground.

Another object of the invention is to provide a tank which can place itself at various angles in a vertical plane for increasing the elevation of fire of cannon or other mounted guns carried by it.

A further object of the invention is to provide a tank which will possess some maneuverability even if the tracks become disengaged or fail from other causes.

Still other objects of the invention are to provide a tank that will raise itself from the ground for purposes of repair and which can right itself if it has turned over.

Figure 1:
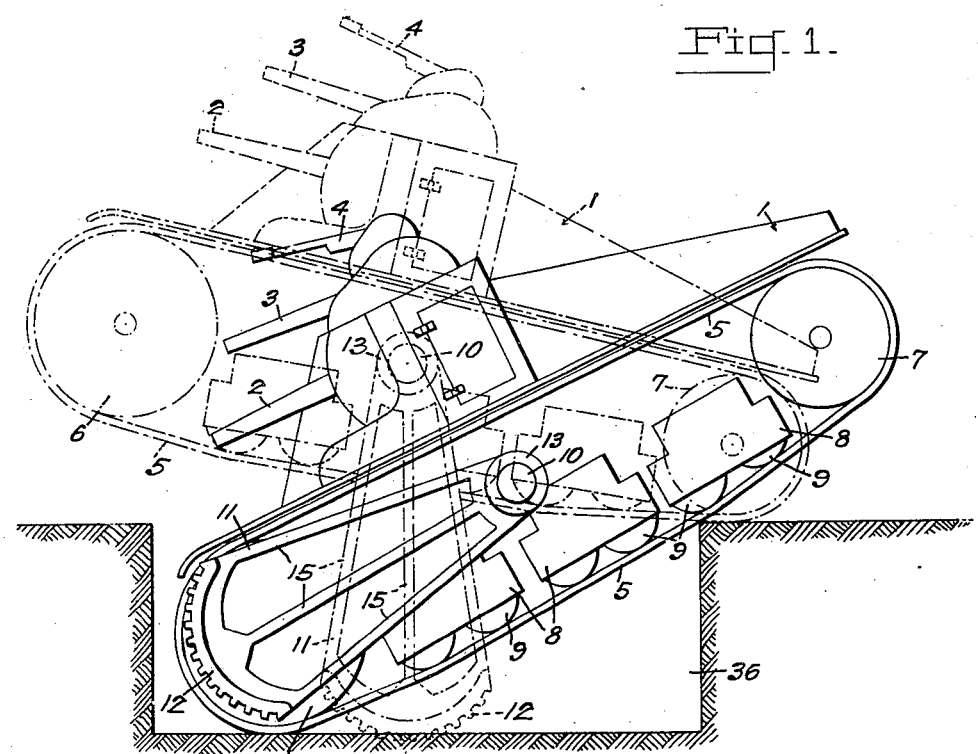

In the accompanying drawing which illustrates an embodiment of the invention, and in which the same reference numeral indicates the same part in the two views, Figure 1 is a side elevation of a tank with the invention applied thereto, showing in full lines a tank with its front end in a trench tank trap and in broken lines the tank in the process of extricating or lifting itself from the trap.

Figure 2:
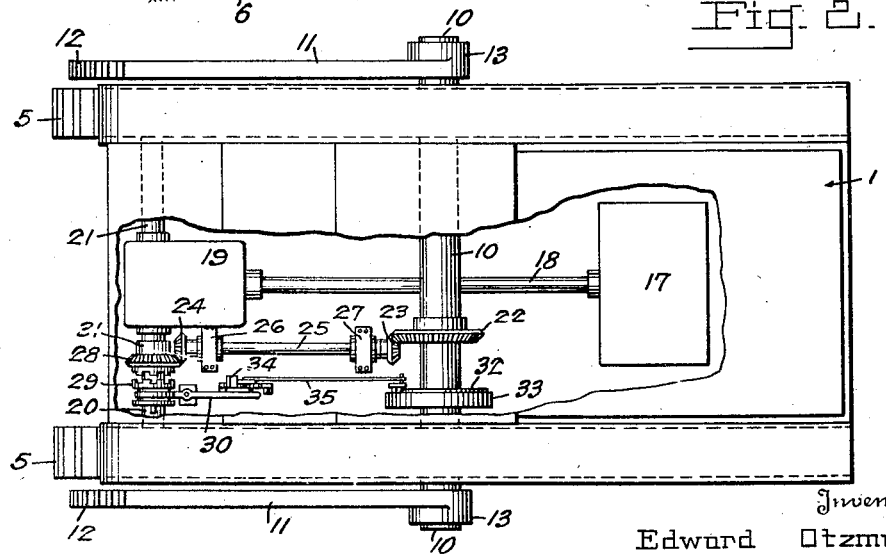

Figure 2 is a plan view of the tank with parts broken away to illustrate certain operative elements.

Referring in detail to the drawing, the general structure of a tank is illustrated and designated generally by the numeral 1. Tank 1 is shown with a turret provided with cannons 2 and 3 and machine gun 4. Track 5 passes around drive sprocket 6 and idlers 7 on both sides of the hull of the tank. Bogies and bogie wheels for supporting and conveying the hull of the tank upon the track 5 are indicated respectively by the numerals 8 and 9. The details of tank structure so far given are more or less common in the art and are merely given here for the purposes of enabling the present invention to be understood and more clearly illustrated.

According to the present invention a shaft 10, supported in suitable bearings, extends across the tank 1. The axis of this shaft lies about midway between the front and rear ends of the tank 1 and between upper returning portion of the track 5 and the lower portion thereof which makes contact with the ground. As may be seen from an inspection of Figure 2, shaft 10 is at right angles to the longitudinal axis of the tank and projects outwardly sufficiently on each side of the tank to receive a lifter 11 on each of the two projecting ends.

Lifters 11 are keyed or otherwise secured to shaft 10, so that lifters 11 rotate when shaft 10 is rotated. In the embodiment shown, each lifter 11 consists of an arc-shaped corrugated shoe portion 12 and a body portion which tapers to the eye 13 opposite the shoe portion. The eye 13 is keyed or otherwise attached to shaft 10. Lifters 11 may be provided with strengthening ribs 15 with webs between these ribs.

When the lifters 11 are not in use, they and their corrugated ends or shoes 12 occupy a position above the level of the lower portion of the track 5, and preferably a position between the level of the lower portion of the track and the level of the upper portion of the track which returns to the driving sprocket 6.

The power for rotating shaft 10 is derived from engine or prime mover 17 which, through shaft 18, transmission 19 and shafts 20 and 21, drives the sprockets or drive wheels 6 which drive tracks 5. Shaft 10 is rotated from drive shaft 20 through bevel gear 22 attached to shaft 10, bevel gears 23 and 24 attached to shaft 25 carried in bearings 26 and 27, and bevel gear 28 within which shaft 20 may freely rotate. Bevel gear 28 carries a clutch member or part with which movable clutch member 29, on shaft 20, engages when lever 30 is operated clockwise. It will be understood, of course, that clutch member 29 rotates with shaft 20 but may be slid longitudinally thereof, and that suitable means indicated at 31 are employed on shaft 20 to hold bevel gear 28 in position on shaft 20 while permitting rotation of shaft 20 therein. From the foregoing it will be understood that when clutch member 29 engages with the clutch member on gear 28, gear 28 rotates with drive shaft 20, and as a consequence gears 24, 23 and 22, and shaft 10 are driven.

It is to be noted that when the shaft 10, carrying the lifters 11, is rotated to actuate the lifters, the tracks 5 of the tank are also driven. Thus, referring to Figure 1, when the lifters 11 are rotated counter-clockwise, the tracks 5 operate to move the tank forward; and conversely when the lifters are rotated clockwise from power from engine 17 the tracks 5 operate to drive the tank backwards.

When the clutch member 29 is disengaged from the clutch member on gear 28, the shaft 10 can be held in a fixed position by means of a brake 32, the drum of which is indicated at 33. This brake may be operated by a pedal or lever 34 connected with the brake by means of a link 35. Any suitable means (not shown) may be provided for locking the pedal 34 in any fixed position.

*Operation.*—In normal condition when the lifters 11 are not in use, they are held between the levels of the upper and lower portions of the track 5. In this position, clutch 29 is disengaged from the clutch member on gear 28 and brake 32 holds the shaft 10 and the lifters 11 in fixed position. The tank may therefore move as usual on its tracks 5. Let it be supposed that the tank enters a trap 36 as shown in full lines in Figure 1. In order to lift or extricate the tank from the trap, the brake 32 is released and clutch member 29 engaged with the clutch member on gear 28, whereupon power is supplied to the shafts 20 and 21. Thereupon, lifters 11 rotate counter-clockwise as shown in broken lines in Figure 1 and lift the front end of the tank out of the trap while the tracks 5 urge the tank forward across the trap.

The mechanism described above may be used to elevate the tank to various angles in a vertical plane to give greater elevation to cannon 2 and 3 carried in the turret. In order to accomplish this, the lifters are rotated counter-clockwise until the tank is tilted upward the desired extent, whereupon the power supply to shafts 20 and 21 is discontinued and the brake 32 applied to hold the shaft 10 and the lifters 11 in this position.

Also the lifters may be used to raise the tank for the purposes of repair. Thus, the lifters may be operated to raise the forward end of the tank while the rear end rests on the ground and the motion of the tracks together with the forward lunging motion produced by the lifters 11 employed to move the forward raised end of the tank over a support, while the lifters themselves act as a second support for the tank, whereby the rear end of the tank assumes an elevated position also. In this raised position, the clutch member 29 is disengaged from the clutch member on gear 28 and the brake 32 applied. Preferably, the support on which the front end of the tank is placed should be one which engages under a portion of the hull between the tracks 5, so that, if desired, the track 5 can be operated when the tank is supported as above described. In the event that it is not desired to operate the tracks 5 when the tank is supported as above described, the track 5 may be driven over a support which would prevent their motion in elevated position. Even though the tracks 5 have been driven upon a support, another support may be placed to engage under the hull at the forward end of the tank between the tracks 5, and the support or supports under the tracks removed.

From the foregoing description it will be seen that if the tracks 5 become disengaged, that the tank still possesses some maneuverability in that the lifters 11 can be rotated to cause the tank to hop or lunge forward, each rotation causing a hop or lunge forward. In the event that the tank turns over, the rotation of the lifters 11 may be used to right it or to assist in righting it.

It is to be noted that the lifters 11 comprise essential an arm with a shoe or portion 12 which engages with the ground in lifting the tank and that the length of the arm from the shoe to the axis of rotation (the axis of shaft 10) is much greater than the distance of the axis of rotation from the portion of the track on which the tank moves forward.

I claim:

1. In combination with a vehicle, an arm on each side of said vehicle and mounted for complete rotation in a plane substantially perpendicular to the surfaces over which the vehicle is intended to run, means carried by the vehicle for rotating said arms, the center of rotation of said arms being so positioned and the length of said arms and being so selected, that the said arms upon rotation will engage the said surfaces to lift the front end of the vehicle even when said surfaces are substantially level.

2. In combination with a vehicle, an arm on each side of said vehicle and mounted for complete rotation about an axis intermediate the front and rear of the vehicle, each of said arms being of greater length than the vertical distance from said axis to the base of the running gear of the vehicle; and means carried by said vehicle for rotating each of said arms.

3. In combination with a combat tank which moves on tracks, an arm on each side of said tank and mounted for complete rotation about an axis intermediate the front and rear of the tank, each of said arms being of greater length than the vertical distance from said axis to the portion of the track on which the tank moves forward; and means carried by said tank for rotating each of said arms.

4. In combination with a vehicle, fully rotating lifting members for said vehicle, said lifting members comprising lifting arms, disposed on each side and intermediate the ends of the vehicle, power means for rotating said lifting members, and brake control means for holding said lifting members in a fixed position.

5. In combination with a vehicle as set forth in claim 4, wherein said lifting arms are flared outwardly to present a comparatively large area to that part of the lifting arm contacting the ground.

6. In combination with a vehicle as set forth in claim 4, wherein said lifting arms are flared outwardly and the outer ends thereof are arcuate in form.

EDWARD OTZMANN.